US009848118B2

(12) United States Patent
Ollila et al.

(10) Patent No.: US 9,848,118 B2
(45) Date of Patent: Dec. 19, 2017

(54) PHASE DETECTION AUTOFOCUS USING OPPOSING FILTER MASKS

(71) Applicant: Intel Corporation, Santa Clara, CA (US)

(72) Inventors: Mikko Ollila, Tampere (FI); Jarno Nikkanen, Kangasala (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/067,269

(22) Filed: Mar. 11, 2016

(65) Prior Publication Data

US 2017/0264811 A1    Sep. 14, 2017

(51) Int. Cl.
*H04N 5/232*    (2006.01)
*H04N 9/04*    (2006.01)

(52) U.S. Cl.
CPC ......... *H04N 5/23212* (2013.01); *H04N 9/045* (2013.01)

(58) Field of Classification Search
None
See application file for complete search history.

(56) References Cited

U.S. PATENT DOCUMENTS

| 8,730,374 | B2 | 5/2014 | Sugawara | |
| 2007/0035705 | A1* | 2/2007 | Hurd | G03B 11/00 353/110 |
| 2013/0222603 | A1* | 8/2013 | Agranov | H04N 5/332 348/164 |
| 2014/0247385 | A1 | 9/2014 | Yamasaki | |
| 2015/0137296 | A1 | 5/2015 | Chen et al. | |
| 2015/0234148 | A1 | 8/2015 | Kusaka | |
| 2016/0021320 | A1 | 1/2016 | Pyeoun | |

OTHER PUBLICATIONS

International Search Report and Written Opinion for International PCT Application Serial No. PCT/US2017/015030 filed Jan. 26, 2017, dated Apr. 18, 2017, 16 pages.

* cited by examiner

*Primary Examiner* — Stephen Coleman
(74) *Attorney, Agent, or Firm* — International IP Law Group, P.L.L.C.

(57) ABSTRACT

An example sensor for phase detection autofocus includes a number of photodiodes to capture light in a number of wavelengths. The example sensor also further includes a color filter array including a grid of alternating color pass filters corresponding to the number of photodiodes. The example sensor further includes a mask including a number of filters to separate a band of light by blocking the band of light on opposing portions of at least two of the alternating color pass filters.

23 Claims, 8 Drawing Sheets

200

600

PHASE DETECTION AUTOFOCUS USING OPPOSING FILTER MASKS

BACKGROUND ART

Imaging devices with multiple lens elements often include an autofocus feature to automatically focus a lens to the distance of an object to be photographed. For example, light reflected off an object and entering the lens at different angles can be separately analyzed to determine an amount of adjustment to be performed to focus on the object.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
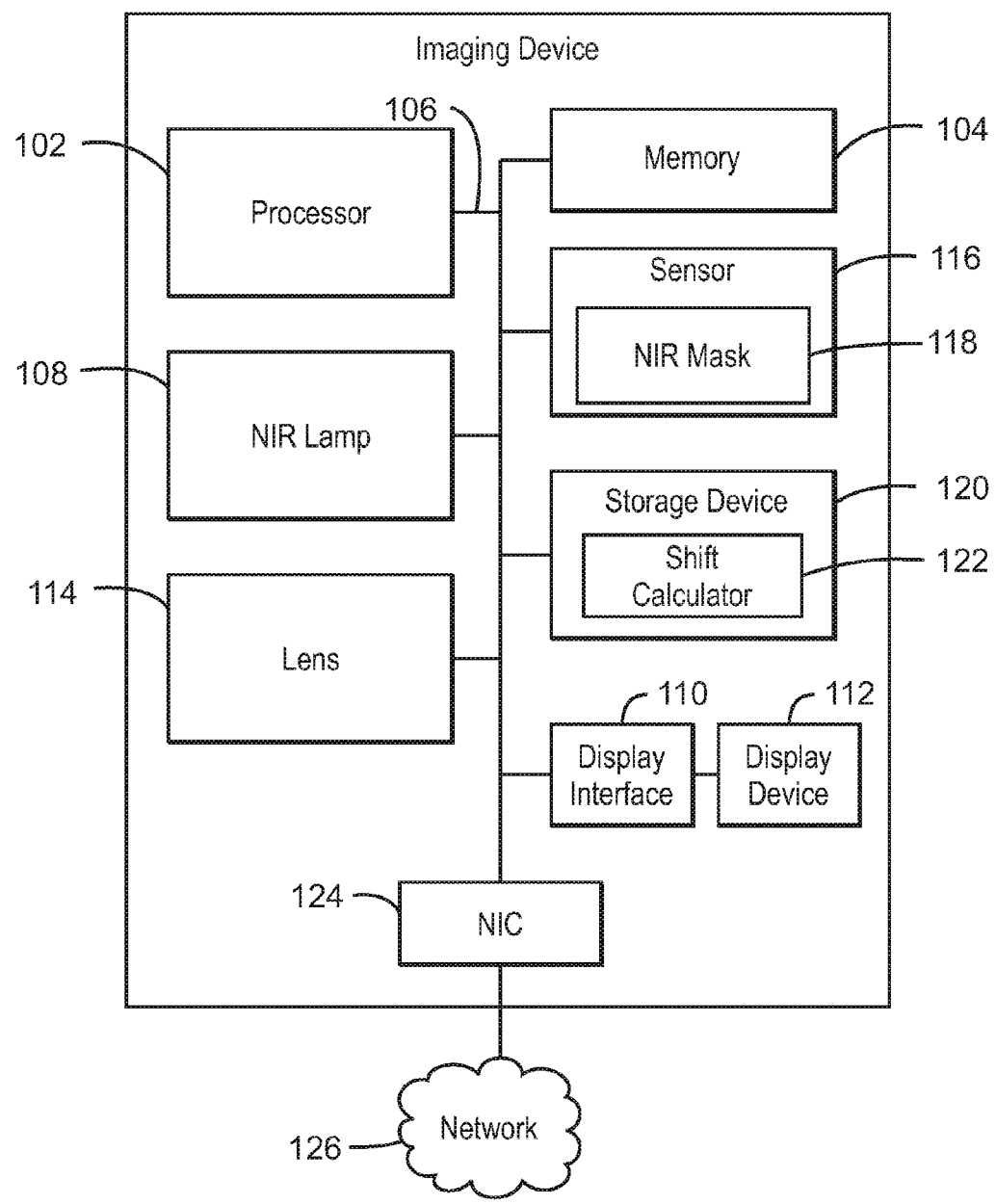
FIG. 1 is block diagram illustrating an example computing device that can be used to autofocus based on phase shift.

Phase Detection Auto Focus (PDAF) can analyze light reflected off an object and entering the lens at different angles to determine an amount of adjustment to be performed on a lens to focus on the object. Traditionally, the PDAF in digital single-lens reflex (DSLR) cameras has been implemented via a separate PDAF sensor in addition to the imaging sensor, but recently on-sensor PDAF is also available. On-sensor PDAF includes using PDAF capability in an imaging sensor.

The present disclosure relates generally to techniques for autofocusing a lens based on PDAF. Specifically, the techniques described herein include an apparatus, method and sensor for autofocusing a lens based on phase shift detected in a band of light that has been separated via a semi-transparent mask. In some examples, the band of light may be the near-infrared band of light. The mask can be a cut-off filter that can block the band of light on opposing portions of photodiodes in an imaging device. Light outside the blocked band of light can be allowed to pass through the cut-off filter. For example, a left side of one photodiode in an imaging sensor may have the mask applied and a right side of another photodiode may have the mask applied. A phase shift between the separated detections can then be calculated. The calculated phase shift can then be used to adjust an autofocus mechanism. Furthermore, in some examples, the mask can be integrated into a color filter array (CFA) of the imaging device. In some examples, a dual aperture can be used in a lens of the imaging device to increase the amount of the band of light entering the lens. In some examples, an electronic cut-off filter can be used to filter out the band of light during image capture. The techniques described herein enable a band of light to be used for autofocus via phase shift detection without reducing the resolution of the color image capture or increased amount of data processing in using additional pixels. Thus, the techniques described herein may be particularly useful in imaging devices utilizing red-green-blue-infrared (RGB-IR) sensors with on-sensor phase detection autofocus, as on-sensor phase detection autofocus utilizes the same sensors for autofocus that are used for image capture. Additionally, the techniques enable all red-green-blue (RGB) pixels to be used for PDAF, providing a more robust focus in cases of difficult object textures and better SNR for the PDAF signal. Furthermore, less output data is used than in approaches utilizing dual pixels to improve autofocus. Moreover, using an IR lamp, the techniques can perform well in low-light conditions. Finally, the techniques can use RGB pixels for focusing when taking infrared images, rather than reserving some of the infrared pixels for autofocus, resulting in increased resolution for infrared images.

Further, in some cases, the techniques described herein can also be used to provide improved depth detection. In some examples, improved monocular depth maps can be generated by using RGB pixels for the purpose of phase detection autofocus. For example, since the depth detection pixels can be on the same silicon, fewer alignment issues may be experienced such as those with stereo-based depth detection using two cameras. Moreover, mechanical structures do not need to be as rigid as in stereo-based depth detection, and thermal-related bending and integration to device issues are also avoided.

As used herein, a color pass filter is an optical filter that allows a particular band of light wavelengths to pass through. For example, a near-infrared (NIR) pass filter may allow the band of light with wavelengths of about 700 to 1400 nanometers to pass through the filter while block all wavelengths of light outside this range. A cut-off filter, as used herein, refers to an optical filter that blocks a particular range of light wavelengths from passing through. For example, a near-infrared cut-off filter may block the band of light with wavelengths of about 800 to 1000 nanometers from passing through the filter while allowing all wavelengths of light outside this range to pass through freely.

Referring now to FIG. 1, a block diagram is shown illustrating an example imaging device that can be used to autofocus based on phase shift. The imaging device 100 may be, for example, a laptop computer, desktop computer, tablet computer, mobile device, or camera, among others. The imaging device 100 may include a central processing unit (CPU) 102 that is configured to execute stored instructions, as well as a memory device 104 that stores instructions that are executable by the CPU 102. The CPU 102 may be coupled to the memory device 104 by a bus 106. Additionally, the CPU 102 can be a single core processor, a multi-core processor, a computing cluster, or any number of other configurations. Furthermore, the imaging device 100 may include more than one CPU 102. In some examples, the CPU 102 may be a system-on-chip (SoC) with a multi-core processor architecture. In some examples, the CPU 102 can be a specialized digital signal processor (DSP) used for image processing. The memory device 104 can include random access memory (RAM), read only memory (ROM), flash memory, or any other suitable memory systems. For example, the memory device 104 may include dynamic random access memory (DRAM).

The memory device 104 can include random access memory (RAM), read only memory (ROM), flash memory, or any other suitable memory systems. For example, the memory device 104 may include dynamic random access memory (DRAM). The memory device 104 may include device drivers 110 that are configured to execute the instructions for device discovery. The device drivers 110 may be software, an application program, application code, or the like.

The CPU 102 may be linked through the bus 106 to a near-infrared (NIR) lamp 108. For example, the NIR lamp 108 can be an NIR LED, or any other suitable source of light in the NIR band.

The CPU 102 may also be linked through the bus 106 to a display interface 110 configured to connect the imaging device 100 to a display device 112. The display device 112 may include a display screen that is a built-in component of the imaging device 100. The display device 112 may also include a computer monitor, television, or projector, among others, that is internal to or externally connected to the imaging device 100.

The CPU 102 may be linked through the bus 106 to an autofocus mechanism of a lens 114. For example, the lens 114 can include one or more glass elements that can be adjusted to focus light onto a sensor 116. The sensor 116 can also be linked through the bus 106 to the CPU 102. The sensor 116 can include a near-infrared mask 118. For example, the NIR 118 mask can be a cut-off filter that blocks a portion of a photodiode from receiving light in the NIR band.

The imaging device 100 also includes a storage device 120. The storage device 120 is a physical memory such as a hard drive, an optical drive, a thumbdrive, an array of drives, a solid-state drive, or any combinations thereof. The storage device 120 may also include remote storage drives. The storage device 120 includes a shift calculator 122. The shift calculator 122 can receive detected light intensity of the separated angles of light from the at least two photodiodes. The shift calculator 122 can then calculate a shift amount and a shift direction based on the separated angles of light. As used herein, a shift direction refers to a direction that a lens is to be shifted in order to focus on an object that is the reflected source of the light being focused. A shift amount, as used herein, refers to an amount of distance that a lens is to be shifted in the shift direction in order to focus on the object that is the reflected source of the light being focused. For example, the shift calculator 122 can calculate the shift direction based on an order of the separated light angles. The shift calculator 122 can calculate the shift amount based on a detected amount of phase shift between the separated angles of light. The shift calculator 122 can also adjust an autofocus mechanism based on the calculated shift amount and shift direction.

The imaging device 100 may also include a network interface controller (NIC) 124. The NIC 124 may be configured to connect the imaging device 100 through the bus 106 to a network 126. The network 126 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The block diagram of FIG. 1 is not intended to indicate that the imaging device 100 is to include all of the components shown in FIG. 1. Rather, the imaging device 100 can include fewer or additional components not illustrated in FIG. 1, such as additional filters, additional lenses, and the like. The imaging device 100 may include any number of additional components not shown in FIG. 1, depending on the details of the specific implementation. Furthermore, any of the functionalities of the CPU 102 may be partially, or entirely, implemented in hardware and/or in a processor. For example, the functionality of the phase shift calculator 122 may be implemented with an application specific integrated circuit, in logic implemented in a processor, in logic implemented in a specialized graphics processing unit, or in any other device.

Figure 2:
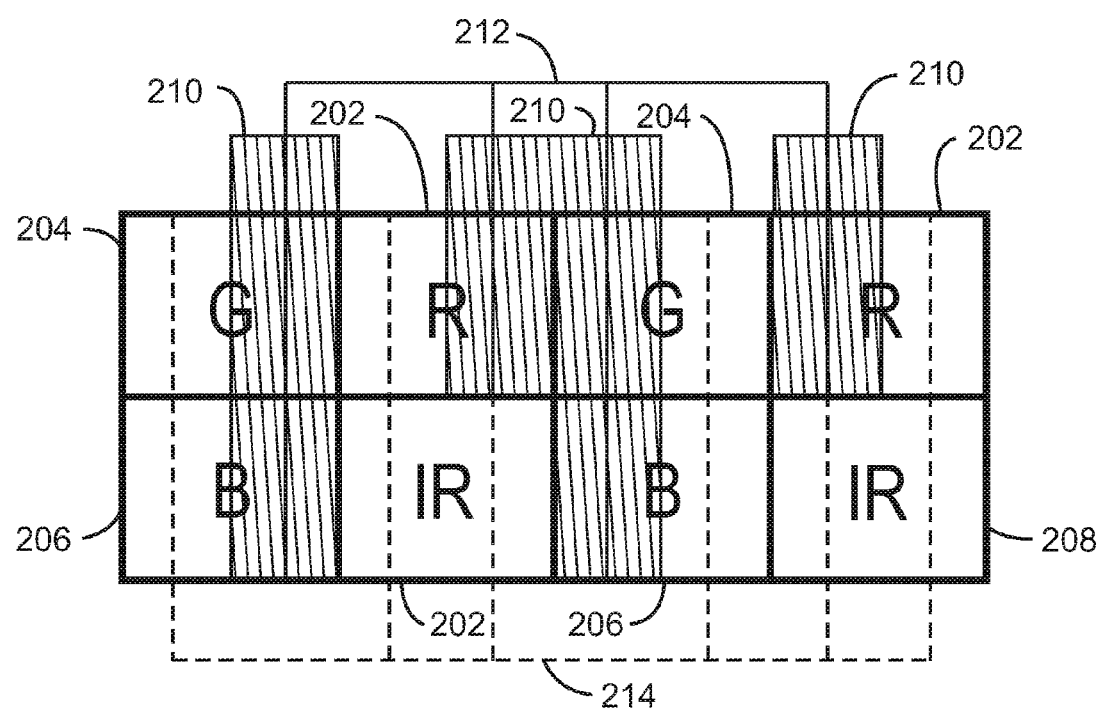
FIG. 2 is a block diagram illustrating an example color filter array with a mask.

FIG. 2 is a block diagram illustrating an example color filter array with a mask. The example color filter array is referred to generally by the reference number 200 and can be implemented using the imaging device 100 of FIG. 1 above. For example, the example color filter array 200 can be implemented in the sensor of FIG. 1 above.

The example color filter array 200 includes two red pass filters 202, two green pass filters 204, two blue pass filters 206, and two infrared (IR) pass filters 208. For example, the IR pass filters 208 can be near-infrared (NIR) pass filters. In some examples, the two red pass filters 202, two green pass filters 204, two blue pass filters 206, also pass NIR bands of light. A mask 210 is shown covering portions of the red pass filters 202, green pass filters 204, and blue pass filters 206. For example, the mask 210 can be a cut-off NIR filter. In some examples, the wavelength blocked by the mask 210 can be in the NIR band of about 800 nanometers to about 1000 nanometers. The masked portions of the color filter array 200 are also indicated by lines 212, and unmasked portions of the color filter array 200 are indicated by lines 214.

As shown in FIG. 2, an R-G-B-IR filter array 200 is designed to have a CFA pattern of 4×2 rather than a typical 2×2 CFA pattern. For example, as viewed from the perspective of a z axis, the filter array 200 may have twice the number of colors in the x axis than the y axis. For example, the x direction may be the direction in which opposing portions of the photodiodes are masked. The filter array 200 can have a semi-transparent mask 210 applied to portions of its red 202, green 204, and blue pass 206 filters. For example, the mask 210 can be an NIR cut-off filter that blocks light wavelengths in the NIR band, but allows all other bands of light to pass through. Thus, NIR light would be blocked in masked portions 210 of the color filter array, but the red, green, and blue light bands would still be able to pass through the mask 110 and then the red 202, green 204, and blue pass 206 filters, respectively. In particular, a left side of each of the RGB color filters, and a right side of each of the RGB color filters is shown masked by mask 110. Thus, for each color of red, green, and blue, two different values of NIR intensity may be detected. For example, a microlens may be used with each of a number of associated photodiodes to focus light through the filters and onto the photodiodes as explained in detail with regards to FIGS. 4 and 5 below. The detected NIR light values may then be used for phase detection autofocus (PDAF) according to the method described in FIG. 7 below. The core principle in PDAF is to separate the light rays that come from the opposite sides of the digital camera aperture, for example the left side and the right side. The disparity between left and right signal can indicate the amount and direction of the lens shift that is needed for a correct focus on a particular object corresponding to the light rays.

The diagram of FIG. 2 is not intended to indicate that the example color filter array 200 is to include all of the components shown in FIG. 2. Rather, the example color filter array 200 can be implemented using fewer or additional components not illustrated in FIG. 2 (e.g., additional red filters, green filters, blue filters, IR filters, masked portions, etc.). For example, different PDAF versus image quality (IQ) versus computing resource tradeoffs may be obtained by using this PDAF approach in only some of the color components and/or spatial areas as explained in FIG. 3 below.

Figure 3:
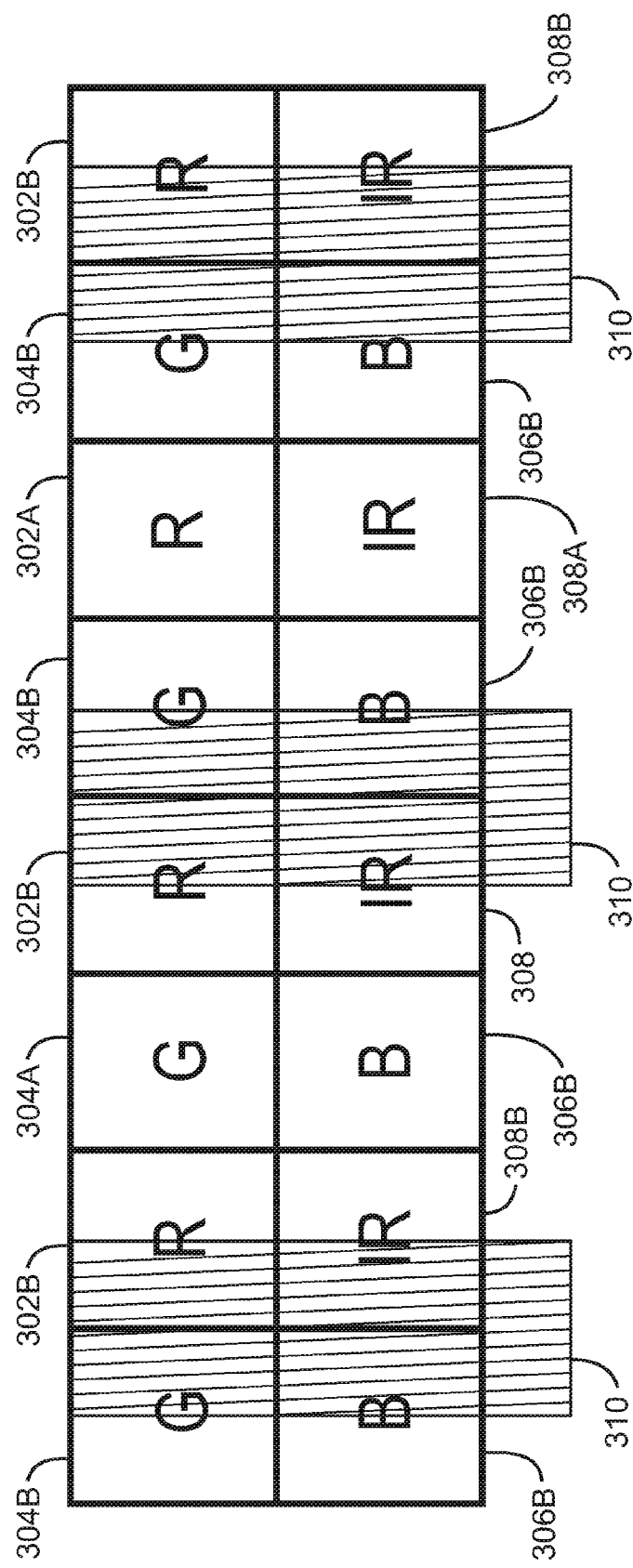
FIG. 3 is a block diagram illustrating another example color filter array with a mask.

FIG. 3 is a block diagram illustrating another example color filter array with a mask. The example color filter array is referred to generally by the reference number 300 and can be implemented using the imaging device 100 of FIG. 1 above. For example, the example color filter array 300 can be implemented in the sensor of FIG. 1 above.

The example color filter array 300 includes one unmasked red pass filter 302A, three masked red pass filters 302B, one unmasked green pass filter 304A, three masked green pass filters 304B, one unmasked blue pass filter 306A, three masked blue pass filters 306B, one unmasked infrared (IR) pass filters 308A, and three masked infrared (IR) pass filters 308B. For example, the IR pass filters 208 can be near-infrared (NIR) pass filters. In some examples, the red pass filters 302A, 302B, green pass filters 304A, 304B, blue pass filters 306A, 306B, also pass NIR bands of light. A mask 210 is shown covering portions of the red pass filters 302B, green pass filters 304B, blue pass filters 306B, and IR pass filters 308B. For example, the mask 310 can be a cut-off NIR filter. In some examples, the wavelength blocked by the mask 310 can be in the NIR band of around 800 nanometers to about 1000 nanometers.

In FIG. 3, the unmasked red 302A, green 304A, and blue 306B pass filters can be used to capture and reconstruct images for preview on a subset of the corresponding photodiodes while the remaining diodes can be used for autofocus. The distance of the closest corresponding left-right pair for a given color component is larger than in the FIG. 2 layout. This increased distance reduces autofocus robustness in the case of some image scenes, but such a design can be easier/cheaper to manufacture due to the simpler structure. Moreover, the unmasked IR pass filters 308A can be used for IR frame reconstruction. For example, monocular depth maps may be reconstructed using left-right pairs of red masked filters 302B or green masked filters 304B. For example, a depth map can be created for each color component via the same disparity calculation used for PDAF. Certain disparities can correspond to certain lens offset that is required to bring that part of image into focus. If the current lens position is known, and what focus distance that corresponds to, then the focus distance that corresponds to the offset lens position can be calculated. By repeating this to all image areas, a monocular depth map can be generated for the image.

In addition, the mask 310 of FIG. 3 also includes less frequent spatial changes in NIR cut. Thus, the mask 310 may be both cheaper and easier to manufacture.

The diagram of FIG. 3 is not intended to indicate that the example color filter array 300 is to include all of the components shown in FIG. 3. Rather, the example color filter array 300 can be implemented using fewer or additional components not illustrated in FIG. 3 (e.g., additional red filters, green filters, blue filters, IR filters, masked portions, etc.).

Figure 4:
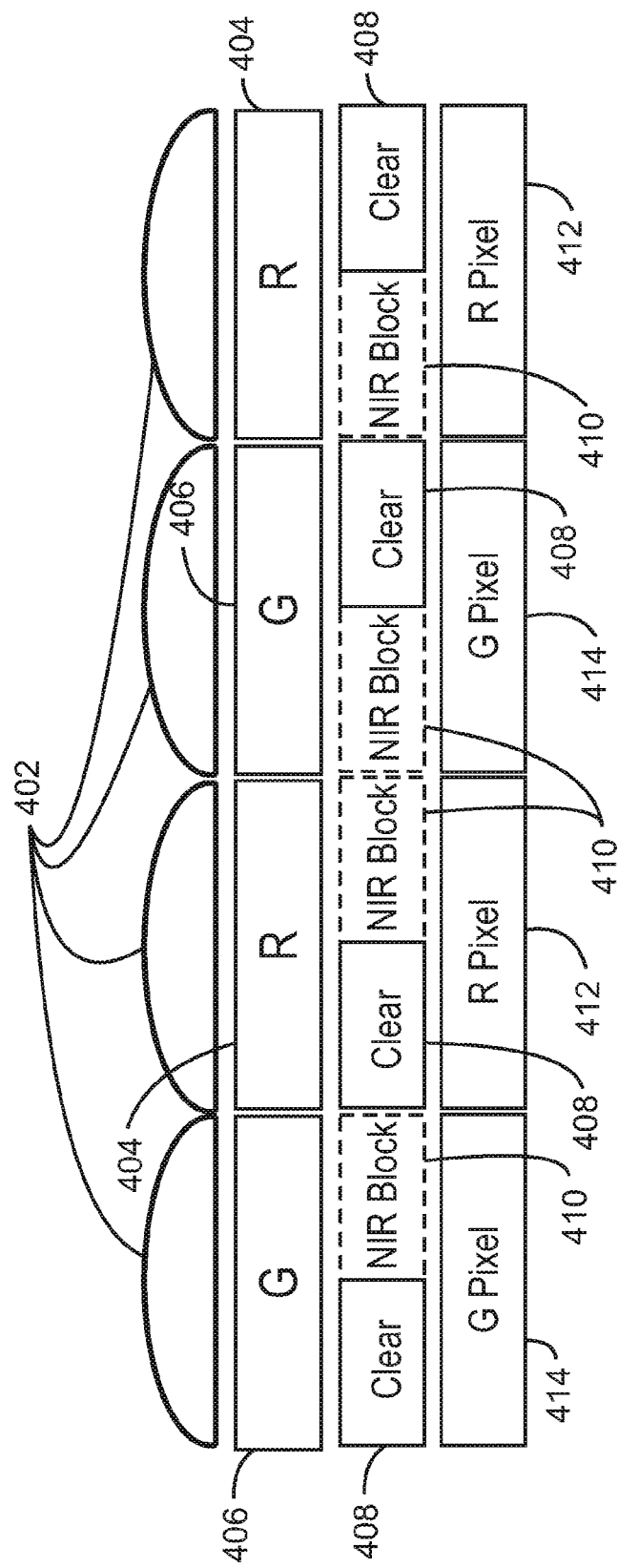
FIG. 4 is a cross section of an example dual layer phase detection autofocus mechanism.

FIG. 4 is a cross section of an example dual layer phase detection autofocus mechanism. The dual layer phase detection autofocus mechanism is generally referred to by the reference number 400 and can be implemented in the imaging device 100 of FIG. 1. For example, the dual layer phase detection autofocus mechanism can be implemented in the sensor of FIG. 1.

The dual layer phase detection autofocus mechanism 400 includes a number of microlenses 402 corresponding to two red pass filters 404 and two green pass filters 406 in a first layer. Under each of the and red pass filters 404 and green pass filters 406, is a second layer including clear portions 408 and masked portions 410. Under the second layer are a number of red pixels 412 and green pixels 414.

In the example dual layer phase detection autofocus mechanism 400, reflected light coming from an object to be photographed can be focused by the microlenses 402 onto corresponding pixels 412, 414. For example, the pixels 412, 414 may be photodiodes capable of detecting light intensity. The reflected light may first pass through either a red pass filter 404 or green pass filter 406. In some examples, the red pass filters 404 and green pass filters 406 enable NIR light to also pass through. The filtered light may then pass through the clear portions 408 and the masks 410. In some examples, the masks 410 can be NIR cut-off filters that block the NIR band of light. Thus, each pair of red pixels 412 and green pixels 414 may have a left side blocked from NIR light and a right side blocked from NIR light. The differences in blocked NIR light may subsequently be used for phase detection autofocus.

The diagram of FIG. 4 is not intended to indicate that the example dual layer phase detection autofocus mechanism 400 is to include all of the components shown in FIG. 4. Rather, the example dual layer phase detection autofocus mechanism 400 can be implemented using fewer or additional components not illustrated in FIG. 4 (e.g., additional pass filters, masks, pixels, microlenses, etc.).

Figure 5:
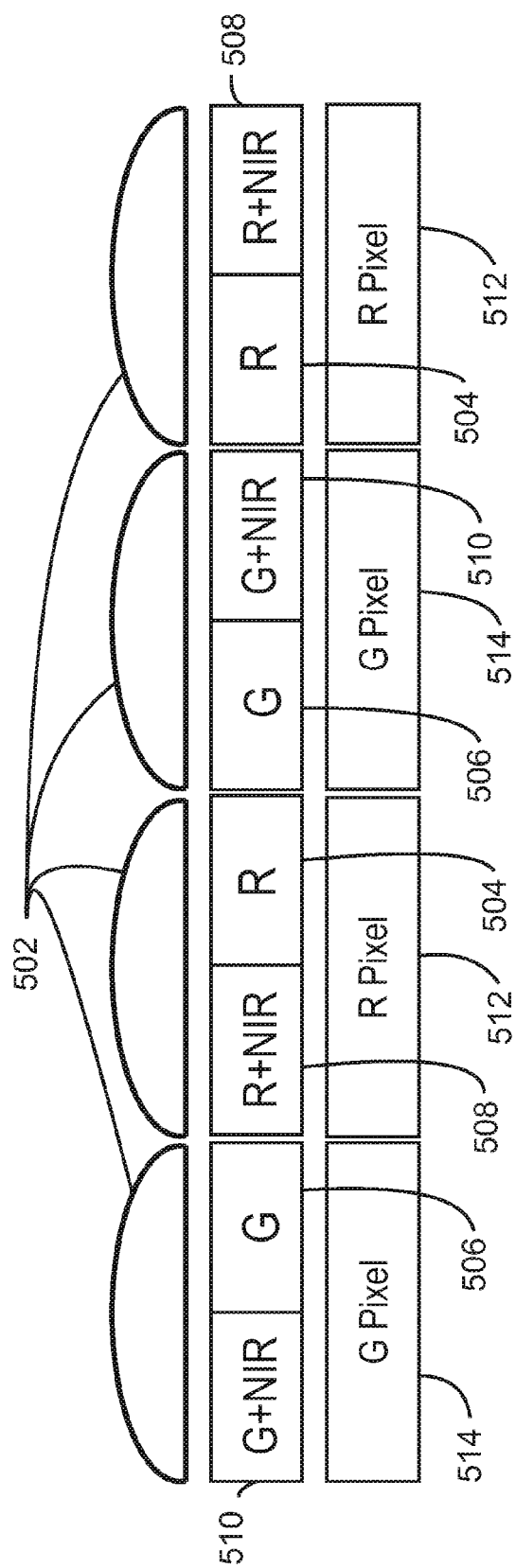
FIG. 5 is a cross section of an example phase detection autofocus mechanism with an integrated mask.

FIG. 5 is a cross section of an example phase detection autofocus mechanism with an integrated mask. The example phase detection autofocus mechanism is generally referred to by the reference number 500 and can be implemented using the imaging device 100 of FIG. 1. For example, the phase detection autofocus mechanism can be implemented in the sensor of FIG. 1.

The phase detection autofocus mechanism 500 includes a number of microlenses 502. Beneath the microlenses 502 is a layer of two red pass filters 504, two green pass filters 506, two dual band R+NIR pass filters 508, and two dual band G+NIR filters 510. Under the layer of filters are a number of red pixels 512 and green pixels 514 for detecting light intensity. For example, the pixels 512, 514 may be photodiodes.

As seen in FIG. 5, a single layer of filters can be formed by combining G+NIR pass filters 510 and green pass filters 506 for each green pixel 514, and combining R+NIR pass filters 508 and red pass filters 504 for each red pixel 512. Thus, as in FIG. 4 above, alternating portions of each color pixel 512, 514 can have the NIR band blocked in order to produce different light intensities on the pixels 512, 514. Again, the differences in blocked NIR light may subsequently be used for phase detection autofocus.

The diagram of FIG. 5 is not intended to indicate that the example phase detection autofocus mechanism 500 is to include all of the components shown in FIG. 5. Rather, the example phase detection autofocus mechanism 500 can be implemented using fewer or additional components not illustrated in FIG. 5 (e.g., additional pass filters, pixels, microlenses, etc.).

Figure 6:
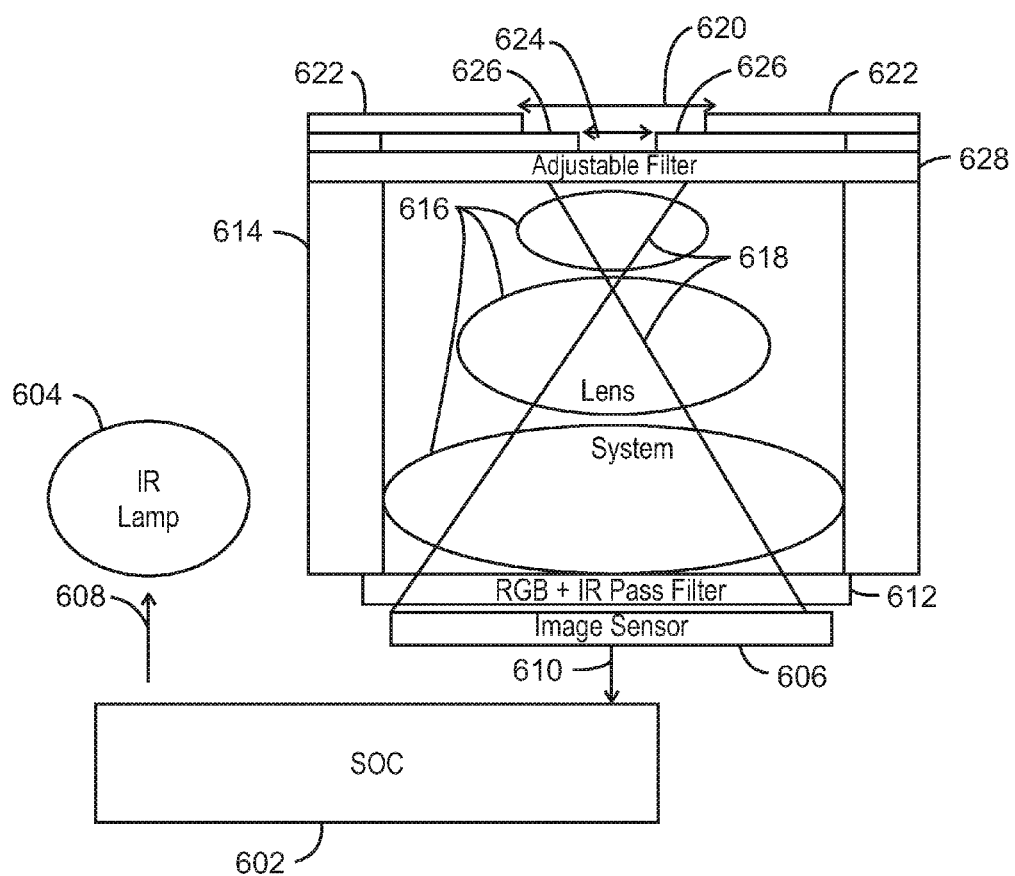
FIG. 6 is a cross section of an example imaging device with a dual aperture lens.

FIG. 6 is a cross section of an example imaging device with a dual aperture lens. The example imaging device is generally referred to by the reference number 600 and can be implemented as the imaging device 100 of FIG. 1 above. For example, the dual aperture lens can be implemented in the lens of FIG. 1.

The example imaging device 600 includes a system-on-chip (SoC) 602, an infrared (IR) lamp 604, and an imaging sensor 606. As shown by an arrow 608, the SoC 602 is electronically coupled to the lamp and may cause the IR lamp 604 to flash. As shown by arrow 610, the SoC 602 is also electronically coupled to the image sensor 606, and can receive sensor information from the image sensor 606. The imaging device 600 also includes an RGB+IR pass filter to allow light in the red, green, blue, and near-infrared (NIR) bands through to the image sensor 606. The imaging device 600 also includes a lens system 614. The lens system 614 can focus light beams 616 via a number of included lens elements 618. The lens system 614 further includes a first aperture 620 formed via a rounded opaque material 622. For example, the opaque material 622 can be black tape. The lens system 614 also includes a second aperture 624 formed via a rounded IR pass filter 626. The lens system 600 further includes an adjustable filter 628. For example, the adjustable filter 628 can be an electrically-controlled liquid crystal filter or electrochromatic filter.

As seen in FIG. 6, the imaging device 600 can use a dual aperture to increase the amount of NIR energy received at the sensor 606. For example, more light in the NIR band is able to pass the larger aperture 620 than light in RGB bands because the RGB bands are filtered by the IR pass filter 626. This can increase the amount of NIR light available to the sensors 606 relative to other bands. Thus, a high quality still image can use a conventional aperture of F2.0-F2.4, while the IR aperture can be as large as F1.6, for example, for better low light sensitivity autofocus. Thus much better IR sensitivity is provided, which means that the PDAF can work at lower light levels than conventional PDAF systems without using an IR lamp. In addition, still image resolution is not deteriorated due to large aperture diameter as the larger aperture is used for IR purposes, and not for color capturing images. Therefore, using the dual aperture feature described above, the signal-to-noise ratio (SNR) for the PDAF signal based on the NIR bands can be increased accordingly.

In some examples, the imaging device 600 can use the electrically adjustable filter 628 on top of the sensor to minimize unwanted IR wavelengths in RGB during still image captures or in video/preview frames when autofocus is not active. For example, the adjustable filter 628 can be an NIR pass/cut-off filter. In some examples, the adjustable filter can be based on liquid crystal (LC) technology. For example, the presence of absence of electrical current can cause liquid crystals in the filter to be arranged such that the NIR band is allowed or blocked. In some examples, a liquid crystal layer can be made reflective for certain wavelengths by selecting the excitation frequency, voltage, and LC material. For example, the layer can be 5 micrometers thick. In some examples, crystal alignment and thickness can also affect a bandwidth of reflectance. For example, differing reflectance can be achieved using different crystal alignments and layer thickness. In some examples, if a frequency is changed the material changes to scattering. In some examples, if excitation is disabled, the liquid crystal layer can be fully transmissive for all bandwidths. In some examples, a greatest reflectance for one liquid crystal layer can be 50% as the layer works through polarization. In some examples, a second liquid crystal layer can be added for another polarization of light and make the greatest reflectance for the two layers up to 100% reflective. In some examples, for narrow bands for reflectance, 10 micrometer thick liquid crystal layers can be used. Thus, by using an adjustable filter, the SNR for the RGB signal can be increased when autofocus is not active. Furthermore, color errors can also be diminished. For example, the NIR energy may not be desirable in the R, G, and B signals. By enabling a global IR cut at the adjustable filter for still image capture, then the impact of the NIR may not need to be eliminated via digital means. This global IR cut can increase the SNR of the color signals and enables better color accuracy.

In some examples, additional features may be included to increase color image quality. For example, a 4×4 Color-Conversion-Matrix (CCM) can be used to reduce the impact of NIR signals on RGB color components. For example, the $4^{th}$ component in the CCM can be the IR component. Alternatively, more sophisticated algorithms can be applied instead of the linear 4×4 matrix operation. For example, suitable algorithms may be used to improve regular RGB image color reproduction on top of regular 3×3 CCM.

The diagram of FIG. 6 is not intended to indicate that the example imaging device 600 is to include all of the components shown in FIG. 6. Rather, the example imaging device 600 can be implemented using fewer or additional components not illustrated in FIG. 6 (e.g., additional sensors, lamps, lens elements, lenses, filters, etc.).

Figure 7:
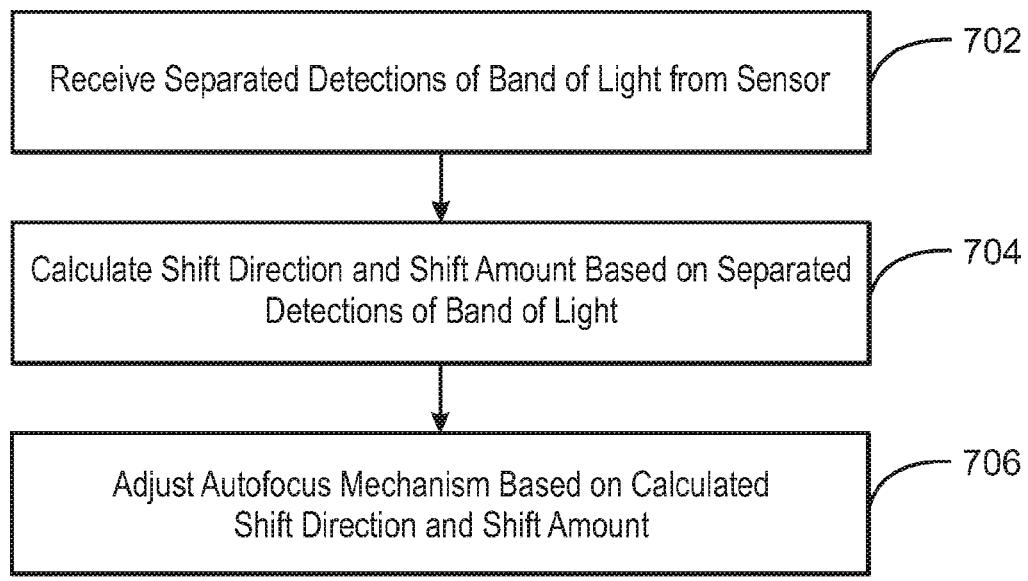
FIG. 7 is a flow chart illustrating a method for adjusting an autofocus mechanism.

FIG. 7 is a flow chart illustrating a method for adjusting an autofocus mechanism. The example method is generally referred to by the reference number 700 and can be implemented using the imaging device 100 of FIG. 1. For example, the method can be performed by the processor of FIG. 1 above or the SoC of FIG. 6 above.

At block 702, the processor receives separated detections of a band of light from a sensor. For example, the sensor can include a mask to separate the band of light by blocking the band of light on opposing portions of at least two photodiodes. The band of light can be a near-infrared (NIR) band. In some examples, the band of light can be blocked via filters applied to alternating left and right portions of a number of photodiodes. For example, the photodiodes can be referred to as left type and right type pixels. In some examples, the filters can be NIR cut-off filters. In some examples, the processor may allow an adjustable filter to pass visible RGB light. The processor can then adjust the adjustable filter to pass the band of light and the visible RGB light before receiving the at least two separated detections.

At block 704, the processor calculates a shift direction and shift amount based on the separated detections of the band of light. In some examples, calculating the phase shift includes calculating a shift direction and a shift distance. For example, the processor can calculate the shift direction based on the separated light detections. For example, a left plane can be defined as including left type pixels receiving light on a left side of a microlens. A right plane can be likewise defined as including right type pixels at the sensor plane receiving light from the microlens. The image planes can then be analyzed to determine a phase difference. In some examples, a negative phase difference may indicate a back focus and a positive phase difference may indicated a front focus. A back focus, as used herein, refers to a focal point behind the camera sensor and a front focus, as used herein, refers to a focus being in front of a camera sensor. For example, the phase difference may be −2.52 pixels, which may indicate a back focus of a particular amount. Based on a particular lens being used, the autofocus mechanism may adjust the lens accordingly so that the focus is on the camera sensor. For example, the processor can detect an amount of phase shift between the at least two separated detections and calculate the shift amount based on the detected amount of phase shift.

At block 706, the processor adjusts an autofocus mechanism based on the calculated shift direction and shift amount. In some examples, the processor can then adjust the adjustable filter to pass visible RGB light after the adjusting the autofocus mechanism. The processor can then cause the sensor to capture an image after the autofocus mechanism is adjusted. For example, the image may be captured with less noise due to the NIR band with the electronic NIR cut-off filter applied.

This process flow diagram is not intended to indicate that the blocks of the example process 700 are to be executed in any particular order, or that all of the blocks are to be included in every case. Further, any number of additional blocks not shown may be included within the example process 700, depending on the details of the specific implementation.

Figure 8:
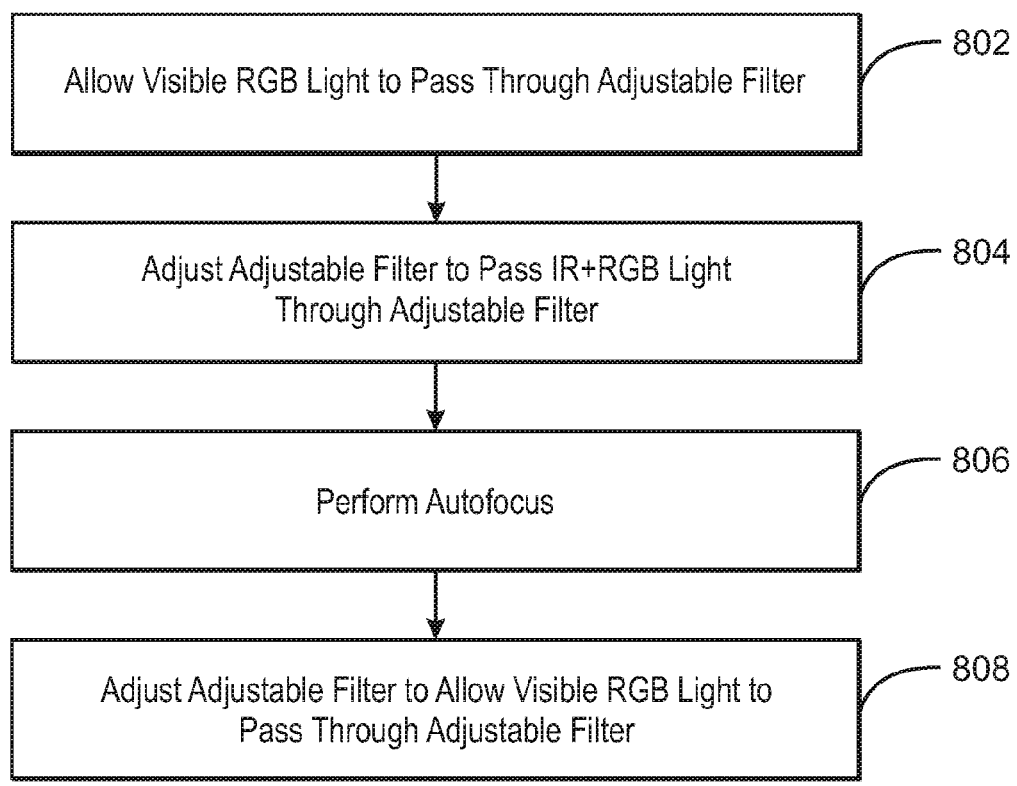
FIG. 8 is a flow chart illustrating a method for adjusting an electronic filter for an autofocus mechanism.

FIG. 8 is a flow chart illustrating a method for adjusting an electronic filter for an autofocus mechanism. The example method is generally referred to by the reference number 800 and can be implemented using the imaging device 100 of FIG. 1. For example, the method can be performed by the processor of FIG. 1 and the adjustable filter of FIG. 6 above.

At block 802, the processor allows the adjustable filter to pass visible RGB light through the adjustable filter. The adjustable filter may block bands of light other than visible RGB light. For example, the adjustable filter may block the near-infrared light band.

At block 804, the processor adjusts the adjustable filter to pass IR+RGB light through the adjustable filter. For example, the processor may allow near-infrared light and visible RGB light to pass through the adjustable filter.

At block 806, the imaging device performs an autofocus. For example, the autofocus can be performed according to the method of FIG. 7 above.

At block 808, the processor adjusts the adjustable filter to allow visible RGB light to pass through the adjustable filter. For example, the adjustable filter can adjust to once again block bands of light outside of the visible RGB band range. Thus, autofocus may be performed without affecting color pictures by capturing near-infrared light during image capture.

This process flow diagram is not intended to indicate that the blocks of the example process 800 are to be executed in any particular order, or that all of the blocks are to be included in every case. Further, any number of additional blocks not shown may be included within the example process 800, depending on the details of the specific implementation.

EXAMPLES

Example 1 is an apparatus for phase detection autofocus. The apparatus includes a plurality of photodiodes to capture light in a plurality of wavelengths. The apparatus also includes a color filter array including a grid of alternating color pass filters corresponding to the plurality of photodiodes. The apparatus further includes a mask including a plurality of filters to separate detection of a band of light by blocking the band of light on opposing portions of at least two photodiodes corresponding to the alternating color pass filters, wherein the separated detections are to be used for phase detection autofocus.

Example 2 includes the apparatus of example 1, including or excluding optional features. In this example, the band of light includes a near-infrared (NIR) band.

Example 3 includes the apparatus of any one of examples 1 to 2, including or excluding optional features. In this example, the plurality of filters include near-infrared (NIR) cut-off filters to block NIR band light while allowing light outside the NIR band through.

Example 4 includes the apparatus of any one of examples 1 to 3, including or excluding optional features. In this example, the color pass filters include dual-pass filters to allow a color band and a near-infrared band through the color pass filters.

Example 5 includes the apparatus of any one of examples 1 to 4, including or excluding optional features. In this example, the mask is integrated into the color filter array via alternating single color pass and dual-band pass filters, wherein the dual-band pass filters enable a color and a near-infrared band to pass through.

Example 6 includes the apparatus of any one of examples 1 to 5, including or excluding optional features. In this example, the band of light is to be generated by an infra-red (IR) lamp.

Example 7 includes the apparatus of any one of examples 1 to 6, including or excluding optional features. In this example, the grid of alternating color pass filters includes a 4×2 pattern.

Example 8 includes the apparatus of any one of examples 1 to 7, including or excluding optional features. In this example, the apparatus includes a color conversion matrix to reduce the impact of near infrared signals on RGB color components.

Example 9 includes the apparatus of any one of examples 1 to 8, including or excluding optional features. In this example, the apparatus includes an adjustable filter to allow near-infrared light through before the phase detection autofocus and block the near-infrared light before an image capture.

Example 10 includes the apparatus of any one of examples 1 to 9, including or excluding optional features. In this example, the apparatus includes a dual aperture to increase the amount of the band of light received at the plurality of photodiodes.

Example 11 is a system for phase detection autofocus. The system includes an imaging sensor including a plurality of photodiodes to capture light in a plurality of wavelengths. The system also includes a lens to focus light onto the imaging sensor; a color filter array including a grid of alternating color pass filters corresponding to the plurality of photodiodes. The system further includes a mask including a plurality of filters to separate a band of light into separated angles of light by blocking the band of light on opposing portions of at least two of the plurality of photodiodes. The system also further includes a phase detection autofocus mechanism to receive detected light intensity of the separated angles of light from the at least two photodiodes. The phase detection autofocus mechanism can also calculate a shift amount and shift direction based on the separated angles of light. The phase detection autofocus mechanism can further adjust an autofocus mechanism based on the calculated shift amount and shift direction.

Example 12 includes the system of example 11, including or excluding optional features. In this example, the imaging sensor is to capture a photo after the autofocus mechanism is adjusted by the phase detection autofocus mechanism.

Example 13 includes the system of any one of examples 11 to 12, including or excluding optional features. In this example, the band of light includes a near-infrared (NIR) band.

Example 14 includes the system of any one of examples 11 to 13, including or excluding optional features. In this example, the plurality of filters include near-infrared (NIR) cut-off filters to block NIR band light while allowing light outside the NIR band through.

Example 15 includes the system of any one of examples 11 to 14, including or excluding optional features. In this example, the color pass filters include dual-pass filters to allow a color band and a near-infrared band through.

Example 16 includes the system of any one of examples 11 to 15, including or excluding optional features. In this example, the mask is integrated into the color filter array via alternating single color pass and dual-band pass filters, wherein the dual-band pass filters enable a color and a near-infrared band to pass through.

Example 17 includes the system of any one of examples 11 to 16, including or excluding optional features. In this example, the shift direction is to be calculated based on an order of the separated light angles and a shift distance is to be calculated based on a detected amount of phase shift between the separated light angles.

Example 18 includes the system of any one of examples 11 to 17, including or excluding optional features. In this example, the system includes an infrared light source to project near-infrared light onto one or more objects to be captured in an image.

Example 19 includes the system of any one of examples 11 to 18, including or excluding optional features. In this example, the lens includes a first aperture to allow the plurality of wavelengths to enter the lens and a second aperture including an infrared filter to allow infrared light to enter the first aperture via the infrared filter and the plurality of wavelengths to enter the second aperture.

Example 20 includes the system of any one of examples 11 to 19, including or excluding optional features. In this example, the lens includes an electrically adjustable filter to allow near-infrared (NIR) light to pass through the electrically adjustable filter during a phase detection autofocus and to block the NIR light via the electrically adjustable filter during an image capture.

Example 21 is a method for adjusting an autofocus mechanism. The method includes receiving, at a processor, at least two separated detections of a band of light from a sensor. The sensor includes a mask to separate the band of light by blocking the band of light on opposing portions of at least two photodiodes. The method also includes calculating, via the processor, a shift amount and shift direction based on the separated detections of the band of light. The method also further includes adjusting, via the processor, an autofocus mechanism based on the calculated shift amount and shift direction.

Example 22 includes the method of example 21, including or excluding optional features. In this example, calculating the shift amount includes detecting an amount of phase shift between the at least two separated detections and calculating the shift amount based on the detected amount of phase shift.

Example 23 includes the method of any one of examples 21 to 22, including or excluding optional features. In this example, calculating the shift direction includes detecting an order of the at least two separated detections and calculating the shift direction based on the detected order of the at least two separated detections.

Example 24 includes the method of any one of examples 21 to 23, including or excluding optional features. In this example, the method includes allowing an adjustable filter to pass visible RGB light. The method also includes adjusting the adjustable filter to pass the band of light and the visible RGB light before receiving the at least two separated detections. The method further includes and adjusting the adjustable filter to pass visible RGB light after the adjusting the autofocus mechanism.

Example 25 includes the method of any one of examples 21 to 24, including or excluding optional features. In this example, the method includes capturing an image after the autofocus mechanism is adjusted.

Example 26 includes the method of any one of examples 21 to 25, including or excluding optional features. In this example, calculating the shift amount and the shift direction includes analyzing a left plane and a right plane to determine a phase difference.

Example 27 includes the method of any one of examples 21 to 26, including or excluding optional features. In this example, the method includes calculating a depth map based on the separated detections of the band of light.

Example 28 includes the method of any one of examples 21 to 27, including or excluding optional features. In this example, the mask includes a near-infrared cut-off filter.

Example 29 includes the method of any one of examples 21 to 28, including or excluding optional features. In this example, the opposing portions of the at least two photodiodes include left and right portions of the at least two photodiodes.

Example 30 includes the method of any one of examples 21 to 29, including or excluding optional features. In this example, the band of light includes a near-infrared light band.

Example 31 is a system for phase detection autofocus. The system includes means for capturing light in a plurality of wavelengths. The system also includes means for focusing light onto the imaging sensor. The system further includes means for filtering light in alternating colors. The system also further includes means for separating a band of light into separated angles of light by blocking the band of light on opposing portions of at least two of the plurality of photodiodes. The system includes means for receiving detected light intensity of the separated angles of light from the at least two photodiodes. The system also includes means for calculating a shift amount and shift direction based on the separated angles of light. The system further includes means for adjusting an autofocus mechanism based on the calculated shift amount and shift direction.

Example 32 includes the system of example 31, including or excluding optional features. In this example, the means for capturing light is to capture a photo after the autofocus mechanism is adjusted by the phase detection autofocus mechanism.

Example 33 includes the system of any one of examples 31 to 32, including or excluding optional features. In this example, the band of light includes a near-infrared (NIR) band.

Example 34 includes the system of any one of examples 31 to 33, including or excluding optional features. In this example, the means for separating the band of light includes near-infrared (NIR) cut-off filters to block NIR band light while allowing light outside the NIR band through.

Example 35 includes the system of any one of examples 31 to 34, including or excluding optional features. In this example, the means for filtering light includes dual-pass filters to allow a color band and a near-infrared band through.

Example 36 includes the system of any one of examples 31 to 35, including or excluding optional features. In this example, the means for filtering light is integrated into a color filter array via alternating single color pass and dual-band pass filters, wherein the dual-band pass filters enable a color and a near-infrared band to pass through.

Example 37 includes the system of any one of examples 31 to 36, including or excluding optional features. In this example, the shift direction is to be calculated based on an order of the separated light angles and a shift distance is to be calculated based on a detected amount of phase shift between the separated light angles.

Example 38 includes the system of any one of examples 31 to 37, including or excluding optional features. In this example, the system includes means for projecting near-infrared light onto one or more objects to be captured in an image.

Example 39 includes the system of any one of examples 31 to 38, including or excluding optional features. In this example, the means for focusing light includes a first aperture to allow the plurality of wavelengths to enter the lens and a second aperture including an infrared filter to allow infrared light to enter the first aperture via the infrared filter and the plurality of wavelengths to enter the second aperture.

Example 40 includes the system of any one of examples 31 to 39, including or excluding optional features. In this example, the means for focusing light includes an electrically adjustable filter to allow near-infrared (NIR) light to pass through the electrically adjustable filter during a phase detection autofocus and to block the NIR light via the electrically adjustable filter during an image capture.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for phase detection autofocus, comprising:
    a plurality of photodiodes to capture light in a plurality of wavelengths;
    a lens to focus light onto the plurality of photodiodes, wherein the lens comprises an electrically adjustable filter to allow near-infrared (NIR) light to pass through the electrically adjustable filter during a phase detection autofocus and to block the NIR light via the electrically adjustable filter during an image capture;
    a color filter array comprising a grid of alternating color pass filters corresponding to the plurality of photodiodes; and
    a mask comprising a plurality of filters to separate detection of a band of light by blocking the band of light on opposing portions of at least two photodiodes corresponding to the alternating color pass filters, wherein the separated detections are to be used for the phase detection autofocus.

2. The apparatus of claim 1, wherein the band of light comprises a near-infrared (NIR) band.

3. The apparatus of claim 1, wherein the plurality of filters comprise near-infrared (NIR) cut-off filters to block NIR band light while allowing light outside the NIR band through.

4. The apparatus of claim 1, wherein the color pass filters comprise dual-pass filters to allow a color band and a near-infrared band through the color pass filters.

5. The apparatus of claim 1, wherein the mask is integrated into the color filter array via alternating single color pass and dual-band pass filters, wherein the dual-band pass filters enable a color and a near-infrared band to pass through.

6. A system for phase detection autofocus, comprising:
    an imaging sensor comprising a plurality of photodiodes to capture light in a plurality of wavelengths;
    a lens to focus light onto the imaging sensor, wherein the lens comprises an electrically adjustable filter to allow near-infrared (NIR) light to pass through the electrically adjustable filter during a phase detection autofocus and to block the NIR light via the electrically adjustable filter during an image capture;
    a color filter array comprising a grid of alternating color pass filters corresponding to the plurality of photodiodes;
    a mask comprising a plurality of filters to separate a band of light into separated angles of light by blocking the band of light on opposing portions of at least two of the plurality of photodiodes; and
    a phase detection autofocus mechanism to:
        receive detected light intensity of the separated angles of light from the at least two photodiodes;

calculate a shift amount and shift direction based on the separated angles of light; and adjust an autofocus mechanism based on the calculated shift amount and shift direction.

7. The system of claim 6, wherein the imaging sensor is to capture a photo after the autofocus mechanism is adjusted by the phase detection autofocus mechanism.

8. The system of claim 6, wherein the band of light comprises a near-infrared (NIR) band.

9. The system of claim 6, wherein the plurality of filters comprise near-infrared (NIR) cut-off filters to block NIR band light while allowing light outside the NIR band through.

10. The system of claim 6, wherein the color pass filters comprise dual-pass filters to allow a color band and a near-infrared band through.

11. The system of claim 6, wherein the mask is integrated into the color filter array via alternating single color pass and dual-band pass filters, wherein the dual-band pass filters enable a color and a near-infrared band to pass through.

12. The system of claim 6, wherein the shift direction is to be calculated based on an order of the separated light angles and a shift distance is to be calculated based on a detected amount of phase shift between the separated light angles.

13. The system of claim 6, further comprising an infrared light source to project near-infrared light onto one or more objects to be captured in an image.

14. The system of claim 6, wherein the lens comprises a first aperture to allow the plurality of wavelengths to enter the lens and a second aperture comprising an infrared filter to allow infrared light to enter the first aperture via the infrared filter and the plurality of wavelengths to enter the second aperture.

15. A method for adjusting an autofocus mechanism, comprising:
    receiving, at a processor, at least two separated detections of a band of light from a sensor, wherein the sensor comprises a mask to separate the band of light by blocking the band of light on opposing portions of at least two photodiodes;
    calculating a depth map based on the separated detections of the band of light;
    calculating, via the processor, a shift amount and shift direction based on the separated detections of the band of light; and
    adjusting, via the processor, an autofocus mechanism based on the calculated shift amount and shift direction.

16. The method of claim 15, wherein calculating the shift amount comprises:
    detecting an amount of phase shift between the at least two separated detections; and
    calculating the shift amount based on the detected amount of phase shift.

17. The method of claim 15, wherein calculating the shift direction comprises:
    detecting an order of the at least two separated detections; and
    calculating the shift direction based on the detected order of the at least two separated detections.

18. The method of claim 15, further comprising:
    allowing an adjustable filter to pass visible RGB light;
    adjusting the adjustable filter to pass the band of light and the visible RGB light before receiving the at least two separated detections; and
    adjusting the adjustable filter to pass visible RGB light after the adjusting the autofocus mechanism.

19. The method of claim 15, further comprising capturing an image after the autofocus mechanism is adjusted.

20. The method of claim 15, wherein calculating the shift amount and the shift direction comprises analyzing a left plane and a right plane to determine a phase difference.

21. The method of claim 15, wherein the mask comprises a near-infrared cut-off filter.

22. The method of claim 15, wherein the opposing portions of the at least two photodiodes comprise left and right portions of the at least two photodiodes.

23. The method of claim 15, wherein the band of light comprises a near-infrared light band.

* * * * *